United States Patent
Li

(10) Patent No.: US 10,108,536 B2
(45) Date of Patent: Oct. 23, 2018

(54) INTEGRATED AUTOMATED TEST CASE GENERATION FOR SAFETY-CRITICAL SOFTWARE

(71) Applicant: General Electric Company, Schenectady, NY (US)

(72) Inventor: Meng Li, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 42 days.

(21) Appl. No.: 14/565,907

(22) Filed: Dec. 10, 2014

(65) Prior Publication Data

US 2016/0170864 A1    Jun. 16, 2016

(51) Int. Cl.
*G06F 9/44* (2018.01)
*G06F 11/36* (2006.01)

(52) U.S. Cl.
CPC ...... *G06F 11/3684* (2013.01); *G06F 11/3676* (2013.01); *G06F 11/3688* (2013.01)

(58) Field of Classification Search
CPC ............ G06F 11/3676; G06F 11/3684; G06F 11/3688
See application file for complete search history.

(56) References Cited

U.S. PATENT DOCUMENTS 5,652,835 A   7/1997 Miller
7,272,752 B2  9/2007 Farchi et al.
(Continued)

FOREIGN PATENT DOCUMENTS

CN   102136047 A   7/2011
CN   102693134 A   9/2012
(Continued)

OTHER PUBLICATIONS

Chuntao Jiang et al., A Survey of Frequent Subgraph Mining Algorithms, The Knowledge Engineering Review, vol. 00:0, 2004, retrieved online on Jun. 18, 2018, pp. 1-31. Retrieved from the Internet: <URL: https://people.csail.mit.edu/jshun/6886-s18/papers/JCZ11.pdf>. (Year: 2004).*

(Continued)

*Primary Examiner* — Hanh Thi-Minh Bui
(74) *Attorney, Agent, or Firm* — GE Global Patent Operation; Nitin Joshi

(57) ABSTRACT

According to some embodiments, system comprises a communication device operative to communicate with a user to obtain one or more requirements associated with a model for a test case generation module; a translation computer module to receive the model, store the model and generate an intermediate model; a generator computer module to receive the intermediate model, store the intermediate model, generate at least one test case; a memory for storing program instructions; at least one test case generation platform processor, coupled to the memory, and in communication with the translation computer module and the generator computer module, operative to execute program instructions to: transform the model into an intermediate model by executing the translation computer module; identify a model type associated with the intermediate model based on an analysis of the intermediate model by executing the generator computer module; select a test generation method based on analysis of the identified model type by executing the generator computer module; generate at least one test case for use in software validation and verification. Numerous other aspects are provided.

13 Claims, 13 Drawing Sheets

(56) References Cited

U.S. PATENT DOCUMENTS

| | | | |
|---|---|---|---|
| 7,296,188 | B2 | 11/2007 | Paternostro et al. |
| 7,392,509 | B2 | 6/2008 | Sinha et al. |
| 7,478,365 | B2 | 1/2009 | West et al. |
| 7,584,451 | B2 | 9/2009 | Iborra et al. |
| 7,644,334 | B2 | 1/2010 | Hickman et al. |
| 7,853,906 | B2 | 12/2010 | Ganai et al. |
| 7,865,339 | B2 | 1/2011 | Rushby et al. |
| 7,970,601 | B2 | 6/2011 | Burmester et al. |
| 7,979,849 | B2 | 7/2011 | Feldstein et al. |
| 8,041,554 | B1 | 10/2011 | Limondin et al. |
| 8,307,342 | B2 | 11/2012 | Oglesby et al. |
| 8,392,873 | B2 | 3/2013 | Agrawal et al. |
| 8,612,171 | B2 | 12/2013 | Awedikian et al. |
| 8,645,924 | B2 | 2/2014 | Li et al. |
| 8,826,255 | B1* | 9/2014 | Avadhanula ............ G06F 8/433 717/154 |
| 8,849,626 | B1 | 9/2014 | Kumar et al. |
| 2005/0043913 | A1 | 2/2005 | Hyde et al. |
| 2006/0010429 | A1 | 1/2006 | Ihara |
| 2007/0050799 | A1 | 3/2007 | Kim et al. |
| 2007/0061354 | A1 | 3/2007 | Sarkar et al. |
| 2008/0056210 | A1 | 3/2008 | Yaqub |
| 2008/0109475 | A1* | 5/2008 | Burmester .......... G06F 17/2785 |
| 2010/0145556 | A1 | 6/2010 | Christenson et al. |
| 2010/0192128 | A1 | 7/2010 | Schloegel et al. |
| 2011/0083121 | A1 | 4/2011 | Dixit et al. |
| 2011/0231823 | A1 | 9/2011 | Fryc et al. |
| 2013/0042222 | A1 | 2/2013 | Maddela |
| 2013/0055194 | A1 | 2/2013 | Weigert et al. |
| 2013/0073063 | A1 | 3/2013 | Kiffmeier et al. |
| 2014/0068339 | A1 | 3/2014 | Farnsworth |
| 2014/0130006 | A1 | 5/2014 | Son et al. |
| 2016/0170714 | A1 | 6/2016 | Siu et al. |

FOREIGN PATENT DOCUMENTS

| | | |
|---|---|---|
| EP | 2131285 A2 | 12/2009 |
| WO | 2012/049816 A1 | 4/2012 |

OTHER PUBLICATIONS

Alessandra Cavarra et al., A Method for the Automatic Generation of Test Suites from Object Models, ACM, 2003, retrieved online on Jun. 18, 2018, pp. 1104-1109. Retrieved from the Internet: <URL: http://delivery.acm.org/10.1145/960000/952748/p1104-cavarra.pdf?i>. (Year: 2003).*

"Simulink—Simulation and Model-Based Design", MathWorks India, Retrieved from:http://www.mathworks.com/products/simulink/, downloaded on Oct. 30, 2014, 4pgs.

"Simulink Design Verifier," MathWorks India, retrieved from: http://www.mathworks.com/products/sldesignverifier/, downloaded on Oct. 30, 2014, 3pgs.

Pasareanu, Corina S. et al., "Model Based Analysis and Test Generation for Flight Software", Third IEEE International Conference on Space Mission Challenges for Information Technology, 2009, DOI: 10.1109/SMC-IT.2009.18, (pp. 83-90, 8 total pages).

"NuSMV: a new systembolic model checker", Retrieved from: http://nusmv.fbk.eu/, downloaded on Nov. 15, 2014, 5pgs.

Zhou, Changyan et al., "Semantic Translation of Simulink Diagrams to Input/Output Extended Finite Automata," Discrete Event Dynamic Systems, vol. 22, No. 2, (2012), DOI: 10.1007/s10626-010-0096-1, (pp. 223-247, 25 total pages)pp. 1-25, 2012.

Li, Meng et al., "Stateflow to Extended Finite Automata Translation," 2011 35th IEEE Annual Computer Software and Applications Conference Workshops (COMPSACW), 2011, DOI: 10.1109/COMPSACW.2011.11, pp. 1-6.

Kumar et al., "Semantic Translation of Time-driven Simulink Diagrams using Input/Output Extended Finite Automata and Application to Automated Test Generation for Simulink/Stateflow Diagrams", Pending U.S. Appl. No. 13/538,472, 2012.

Li, Meng et al., "Model-Based Automatic Test Generation for Simulink/Stateflow using Extended Finite Automaton," In proceedings of the 8th IEEE International Conference on Automation Science and Engineering (Case 2012), Aug. 20-24, 2012, Seoul, Korea, (pp. 857-862, 8 total pages).

Anand, Saswat et al., "An Orchestrated Survey on Automated Software Test Case Generation", Journal of Systems and Software, Feb. 11, 2013, 28pgs.

Li, Meng et al., "Recursive Modeling of Stateflow as Input/Output-Extended Automaton", IEEE Transactions on Automation Science and Engineering, vol. 11, No. 4, Oct. 2014, DOI: 10.1109/TASE.2013.2272535, (pp. 1229-1230. 11 total pages).

Li, Meng et al., "Reduction of Automated Test Generation for Simulink/Stateflow to Reachability and its Novel Resolution," 2013 IEEE International Conference on Automation Science and Engineering (CASE), Aug. 2013, (pp. 1089-1090, 6 total pages).

"Control and Logic Application Development", Scade Suite—Esterel Technologies, Retrieved from: http://www.esterel-technologies.com/products/scade-suite/, downloaded on Oct. 28, 2014, 2pgs.

Oh, Jungsup et al., "A Model Independent S/W Framework for Search-Based Software Testing", The Scientific World Journal, vol. 2014, Article ID 126348, 2014, 12 Pages.

"Automated Testing and Validation with Reactis," Reactive System, Inc., Oct. 28, 2014, Retrieved from: http://www.reactive-systems.com/, downloaded on Oct. 28, 2014, 1pg.

European Search Report and Opinion issued in connection with corresponding EP Application No. 15196758.5 dated May 10, 2016.

Li et al., filed Nov. 20, 2015, U.S. Appl. No. 14/947,633.

Karsai, G., et al., "Model-Integrated Development of Embedded Software," Proceedings of the IEEE, vol. 91, No. 1, pp. 145-164 (Jan. 2003).

Nahar, N., and Sakib, K., "SSTF: A Novel Automated Test Generation Framework using Software Semantics and Syntax," 17th International Conference on Computer and Information Technology (ICCIT), pp. 69-74 (2014).

Potter, B., "Model-Based Design for DO-178B," MathWorks, pp. 1-33 (2008).

Porter, J., et al., "Towards Model-Based Integration of Tools and Techniques for Embedded Control System Design, Verification, and Implementation," Institute for Software Integrated Systems, vol. 5421, pp. 20-34 (2009).

Non-Final Rejection towards U.S. Appl. No. 14/947,633 dated Jun. 3, 2016.

Final Rejection towards U.S. Appl. No. 14/947,633 dated Dec. 16, 2016.

Combined Search and Examination Report issued in connection with related GB Application No. 1619371.6 dated Apr. 20, 2017.

* cited by examiner

INTEGRATED AUTOMATED TEST CASE GENERATION FOR SAFETY-CRITICAL SOFTWARE

BACKGROUND

Developing a system with a software component often may involve system requirements provided by a customer. These requirements may be incorporated into software. After the software is designed it may be validated and verified to confirm that it adequately satisfies the requirements. The validation and verification processes may account for a large portion of the cost of the software. The timeliness of the validation and verification processes may impact core business performance, customer satisfaction and corporate reputation, for example.

Therefore, it would be desirable to design an apparatus and method that provides for a quicker way to validate and verify that the software complies with the requirements, functions correctly and appropriately covers the objectives per the requirements.

BRIEF DESCRIPTION

According to some embodiments, a test case is generated by the application of a translation computer module and a generator computer module, and may be used to verify and validate the software requirements. The translation computer module is applied to one or more specification models and design models to generate an intermediate model, and then the test case is generated via execution of the generator computer module on the output of the translation computer module (e.g., intermediate model).

A technical effect of some embodiments of the invention is an improved technique and system for test case generation. With this and other advantages and features that will become hereinafter apparent, a more complete understanding of the nature of the invention can be obtained by referring to the following detailed description and to the drawings appended hereto.

Other embodiments are associated with systems and/or computer-readable medium storing instructions to perform any of the methods described herein.

DRAWINGS

DETAILED DESCRIPTION

Figure 1:
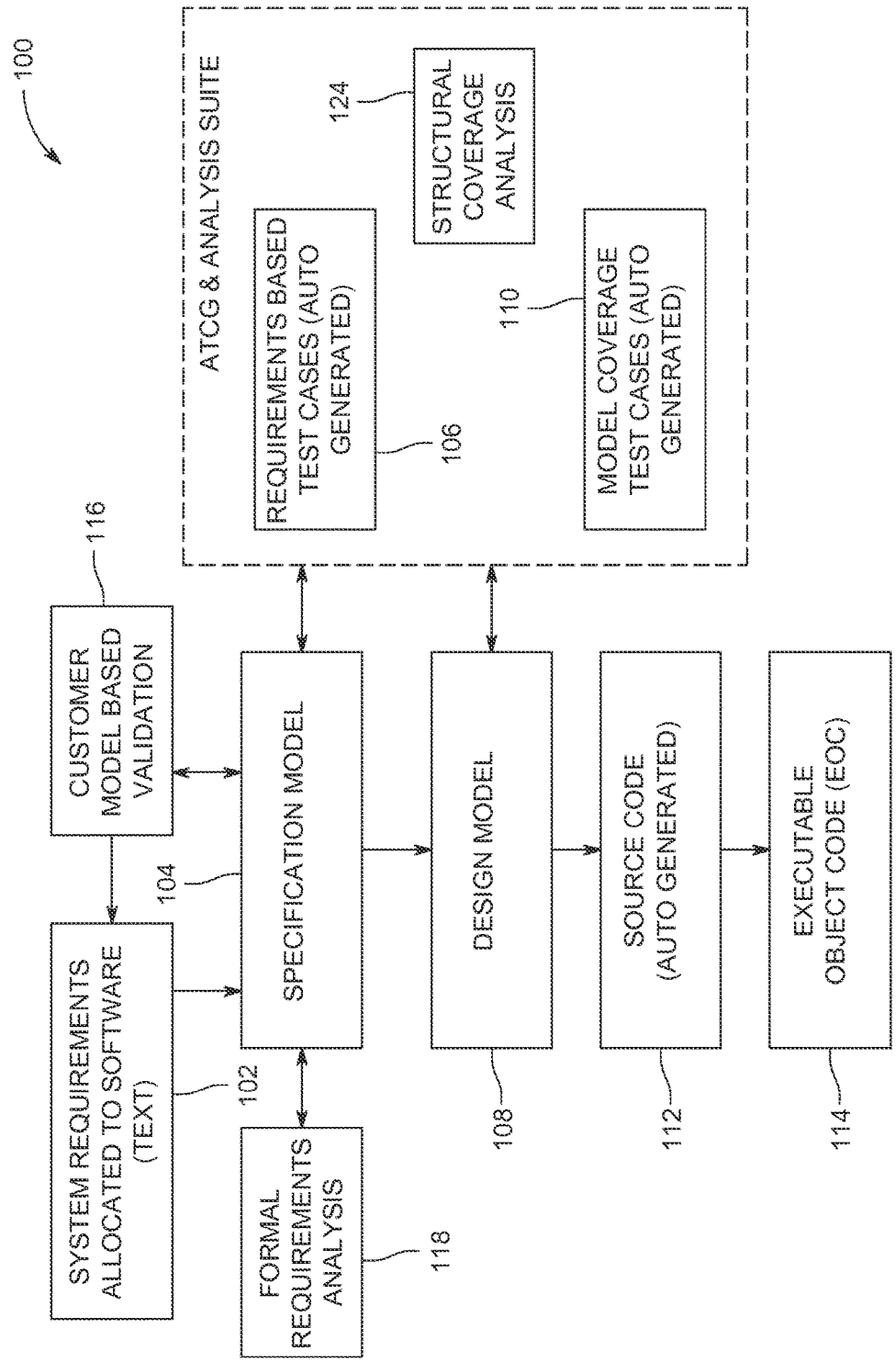
FIG. 1 illustrates a system according to some embodiments.

Developing a system with a software component often may involve system requirements provided by a customer. These requirements may be incorporated or captured in a specification model in a computer-readable form. The requirements may also be captured in the specification model in a human-readable form. Then a design model may be developed from the requirements contained in the specification model, and may express software design data (e.g., prescribed software component internal data structures, data flow, and/or control flow). Source code may then be generated automatically from the design model using a qualified code generator. After the software is designed (e.g., design model) it may be validated and verified to confirm that the software adequately satisfies the requirements. The validation and verification processes may account for a large portion of the cost of the software. The timeliness of the validation and verification processes may impact core business performance, customer satisfaction and corporate reputation, for example.

Traditionally, for example, many safety-critical software (e.g., aviation software) is required to be tested with strict test coverage, such as Modified Condition/Decision Coverage (MC/DC), which requires each condition to independently affect the decision. Manual inspection of the model/code to identify the input sequences that drive an internal variable to a particular value is hard and time consuming, especially when the software (e.g., aviation software) is large and the complexity is growing. Traditional testing suffers from at least one of low structural/model coverage, unsupported blocks/features, and long test generation time. For example, traditional testing approaches may blindly apply one test generation method on all specification/design models of the software. However, one test generation method may not be suited to all specification/design models and may result in a long test generation time, or may result in no test case being generated at all.

In one traditional approach, for example, while the test case generation approach may show un-reachability of certain model elements, and may generate test inputs that satisfy standard coverage objectives as well as user-defined test objectives and requirements, the approach may have unsupported blocks (e.g., "integrator" block), may not be able to express all of the design properties (e.g., true liveness properties), and may require a pre-defined upper bound of test case length. In another traditional approach, for example, while the approach may use a combination of random testing and may therefore generate test cases very quickly, however, due to the randomness of the search, high coverage is hard to achieve (e.g., model size and complexity may lead to lower structural coverage). This approach may also be heuristic without explanation and may be limited regarding the length of generating input signals.

Some embodiments identify a type of the specification/design model (e.g., ones with symbolic variables, real numbers, nonlinear arithmetic, feedback loops, etc.), and then guide the test generation process by selecting appropriate test methods/modules best-suited for the model, so that the tests are generated more effectively and efficiently. One of the advantages of selecting the best-suited test module/method based on the identity of the model is that there may be no need to include a time consuming trial and error process, and the analysis of the model may only be performed once, which may also save time. Another advantage may be that the best-suited test module/method itself may avoid time-consuming test generation efforts (e.g., searching feedback loops) and abstractions (e.g., approximation of real numbers) compared to other test modules/methods, thereby saving time and achieving a higher test coverage.

Another advantage of embodiments of the invention is that the selection process for selecting the best-suited module/method may be fully automated. In some embodiments the mathematical formulas may be derived by finding the computation paths in the intermediate models, which are automatically translated from the Design or Specification Models, as further described below. The mathematical formulas may be combined by substituting the internal signals with their output assignments. Then the final set of mathematical formulas may include output assignment functions that determine the values of the test objective signals, and data update functions that determine how the model will evolve (e.g., difference equations). These mathematical formulas may be machine-readable and the model types may be identified by recognizing formula patterns by looking up a formula pattern database. Conventional manual model type identification requires expert knowledge and is time-consuming as the model size grows and feedback loops are introduced. The automated model type identification element in embodiments of the invention can identify the model type by clicking one button, for example.

Some embodiments may take as input the specification model and the design model and automatically output the test descriptions, test cases and test procedures that satisfy appropriate model coverage criteria. Some embodiments may include test cases and procedures including inputs and expected output values that may be intended to be executed against the design model and Source Code/Executable Object Code to check their compliance with the specification model. In other words, in some embodiments, test cases may be generated from the specification model and are executed on the design model to verify if the design model is a truthful implementation of the requirements. In some embodiments, test cases may be generated from the design model and executed on the Source Code/Executable Object code to verify the source code complies with the design model.

Some embodiments may automatically identify a specification/design model type based on an intermediate representation of the model. One or more embodiments may automatically reduce the intermediate model, where the reduced model may also be mapped to the intermediate model for model identification. One or more embodiments may automatically select the appropriate test generation module to generate the test case based on the model identification result. In one or more embodiments, selecting the appropriate test generation module may achieve efficiency and effectiveness.

FIG. 1 is an example of a software development system 100, according to some embodiments. The system 100 may include system requirements 102, a specification model 104, a requirements based automated test case generation module 106, a design model 108, a source code module 112, an executable object code module 114, and a structural coverage analysis module 124. As used herein, "system requirements," "software requirements," and "requirements" will be used interchangeably.

In some embodiments, a text version of system requirements 102 to be allocated to software are acquired. From these requirements 102, the specification model 104 is developed. In one or more embodiments, the specification model 104 may be developed using a combination of semantic modeling and graphical modeling technologies. Other suitable specification model development technologies may be used. In one or more embodiments, the specification model 104 may be validated with the customer via a customer validation module 116. In some embodiments the specification model 104 may be formally analyzed and verified for correctness and consistency with a formal requirements analysis module 118 using automated theorem proving. Other suitable means of analysis and verification may be used.

After the specification model 104 is validated by the customer validation module 116 and the formal requirements analysis module 118, the specification model 104 may be passed as an input to a model based design team to create a design model 108. In one or more embodiments, the design model may be simulated with requirements-based test cases generated from the Specification model so that errors can be caught at the design model level. In one or more embodiments, the source code module 112 may be auto-generated from the design model 108.

In some embodiments, the specification model 104 may be used as an input to the requirements based automated test case generation module 106 ("test case module"). Test cases and procedures may be automatically generated by the test case module 106, as will be further described below, and may then be applied to the design model 108. In one or more embodiments, the test case module 110 may be used to assist an engineer to identify unreachable code, and to identify a test vector that may execute the specific section of the model. In one or more embodiments, test cases generated with test case module 107 may be applied to the design model 108, and analyzed for structural coverage with the structural coverage analysis model 124. The structural coverage analysis module 124 may identify gaps in test coverage of the requirements based test cases executed on the design model, such as, unintended functionality, dead code, derived requirements, etc. In the case of derived requirements, for example, test cases may be automatically generated with the model coverage test case module 110 to satisfy structural coverage.

In one or more embodiments, the test cases may also be executed on source code via the source code module 112, and executable object code via the executable object code module 114.

Figure 2:
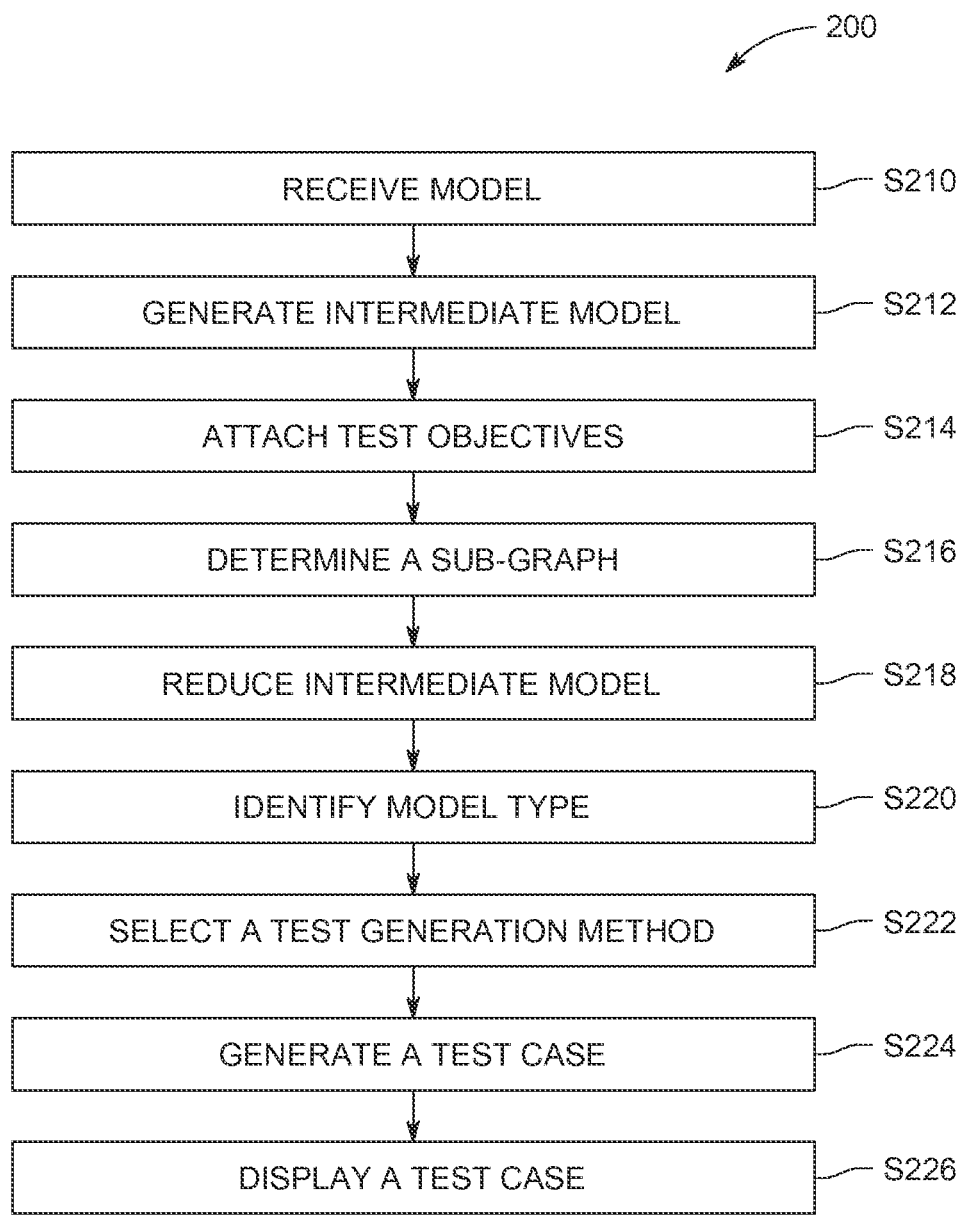
FIG. 2 illustrates a flow diagram according to some embodiments.
Figure 3:
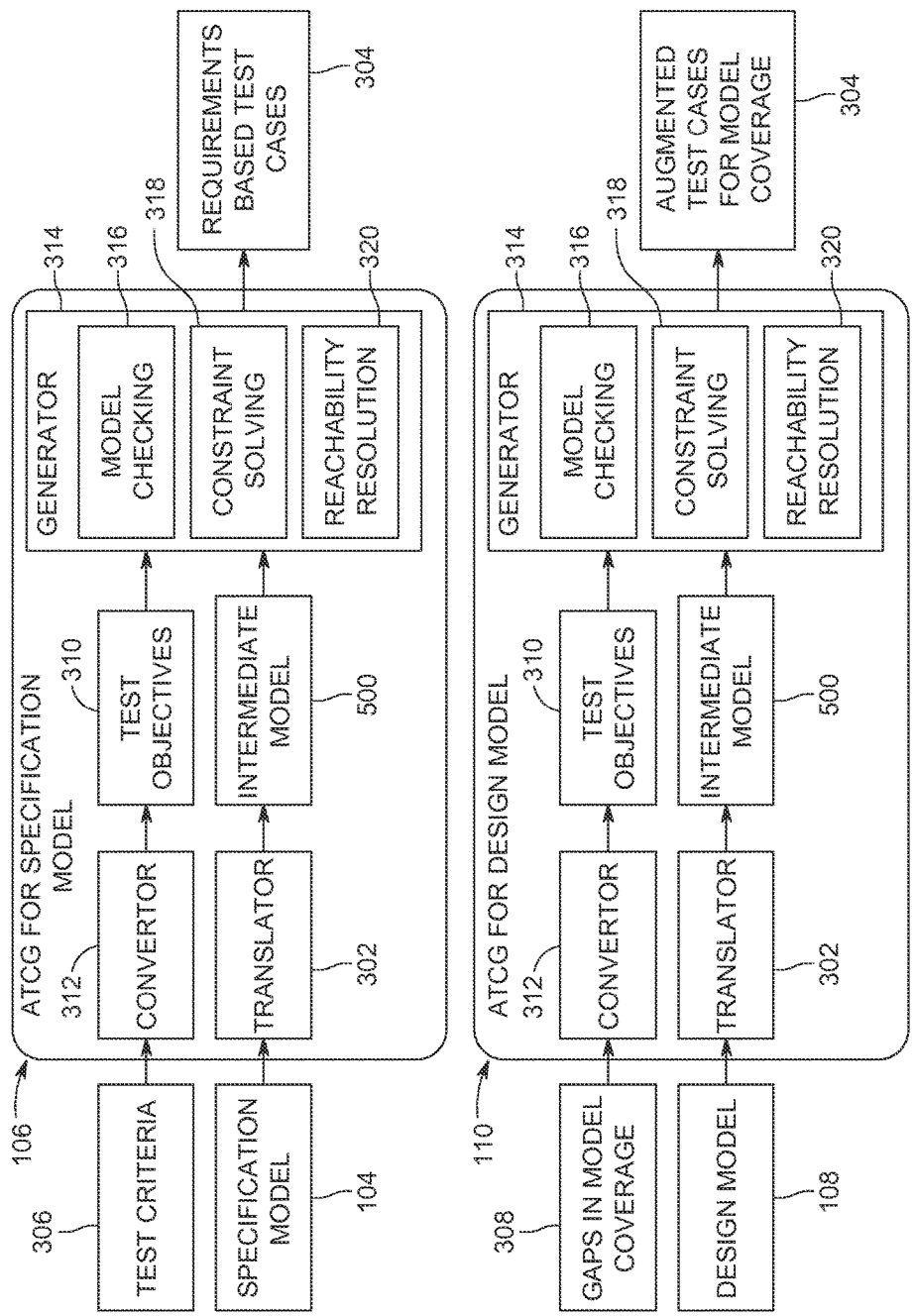
FIG. 3 illustrates a block diagram of a system according to some embodiments.

Turning to FIGS. 2-6, in one example operation according to some embodiments, FIG. 2 is a flow diagram of a process 200. Process 200 and other processes described herein may be performed using any suitable combination of hardware (e.g., circuit(s)), software or manual means. In one or more embodiments, the system 100 is conditioned to perform the process 200 such that the system 100 is a special purpose element configured to perform operations not performable by a general purpose computer or device. Software embodying these processes may be stored by any non-transitory tangible medium including a fixed disk, a floppy disk, a CD, a DVD, a Flash drive, or a magnetic tape. Examples of these processes will be described below with respect to the elements of the system 100, but embodiments are not limited thereto.

Initially, at S210, a model is received at the test case module 106. The model may be one of a specification model 104 or a design model 108. In one or more embodiments, with the specification model 104 and design model 108 ready, a user may generate the requirements based test cases from the specification model 104 for evaluation on the design model 108, and may generate augmented test cases to satisfy model coverage. In one or more embodiments, the specification/design models 104/108 may be written in Simulink™/Stateflow™ or SCADE™. Any other suitable model-based development language may be used in the writing of the specification/design models 104/108. The specification/design models 104/108 may be written in any other suitable language. In one or more embodiments, a variable map (not shown) is received in addition to the specification models 104. In some embodiments, the variable map may list the variable names in the specification model 104 and their equivalent variable names in the design model 108. The variable map may be provided by at least one of a requirements engineer and a designer, for example.

Figure 4:
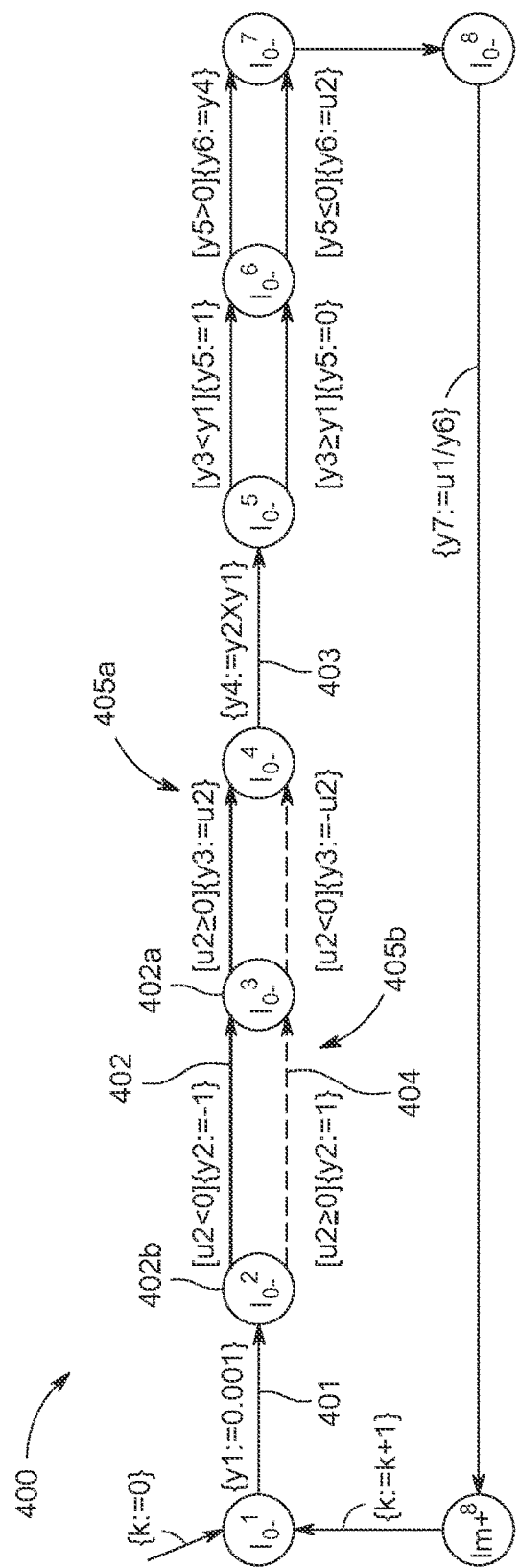
FIG. 4 illustrates a model according to some embodiments.

Then in S212, an intermediate model 400 (FIG. 4) is generated. In one or more embodiments, an automated translation approach may be applied to the specification/design model 104/108 via a translation computer module 302 "translator" (FIG. 3) to analyze and translate the specification/design model 104/108 to an intermediate model 400. In some embodiments, the intermediate model 400 may be referred to as an Input/Output Extended Finite Automaton (I/O-EFA). In one or more embodiments, the intermediate model 400 may preserve the behaviors between the inputs and outputs of the requirements observed at sampling times. In one or more embodiments, the translation may formalize and automate the mapping from computation sequences of specification/design models 104/108 to the computation paths in the translated intermediate (I/O-EFA) models 400. As used herein, a computation path is a sequence of transitions that are connected. As shown in FIG. 4, there may be more than one computation path or sub-path to a given location. While FIG. 4 provides several computation paths, the example to follow will focus on a portion (transition) of two different paths 405a and 405b. Both paths begin with a first transition 401. With path 405a, from transition 401, the path may continue through transition 402 as indicated by the bold arrow, to transition 403. As another example, instead of the path 405a continuing from 401, to 402, to 403, path 405b may continue from transition 401 to transition 404, as indicated by the dotted arrow, to transition 403. In one or more embodiments the computation path may describe the model behaviors. As used herein, a computation sequence is a sequence of computations performed by the specification/design models in one time cycle. In some embodiments, the intermediate model extracts and analyzes the computation sequences in the specification/design model. In one or more embodiments, the translation computer module 302 may be automated translation tool SS2EFA in Matlab®. While the examples described herein present a translation approach from Simulink™ to I/O-EFA, other translations into an automation may be used (e.g., translated into a unified modeling language).

Figure 5:
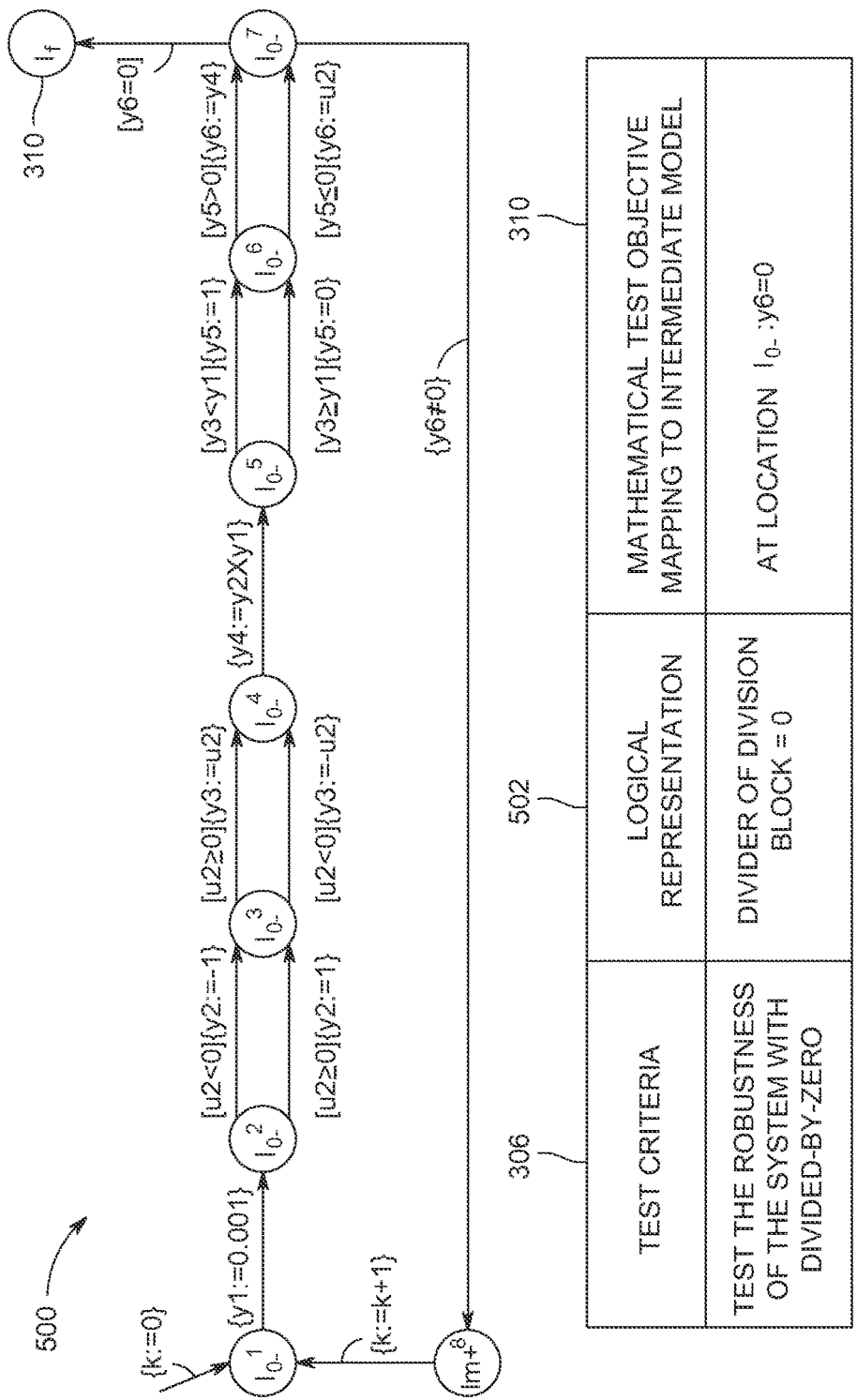
FIG. 5 illustrates a model according to some embodiments.

In one or more embodiments, test criteria 306 for the specification model 104 and gaps in model coverage 308 for the design model 108 may be converted into a logical representation 502 (FIG. 5) and then converted to test objectives 310 by a converter module 312 "convertor" (FIG. 3) and then the test objective 310 are attached to the intermediate model 400 in S214, as shown in FIG. 5. For example, the converter module 312 may receive test criteria/gaps in model coverage as input, translate or covert this information to a logical representation and then covert the logical representation into a mathematical test objective or representation that maps to the intermediate model. In one or more embodiments, the test objectives 310 may set the goals for a generator computer module 314 "generator" to drive the models to. In one or more embodiments, each test objective 310 may be associated with a test objective path in the intermediate model 400, such that the intermediate model with test objective 500 is displayed in FIG. 5. As will be further described below, the generator computer module 314 analyzes the intermediate model with test objective 500 and applies automated test generation approaches based on the translated intermediate model with test objective 500 to find a set of input-output sequences, also called test cases 304, which achieve or execute the test objectives (e.g., all the requirements in the specification model and missing coverage for the design model). In one or more embodiments, the test case module 106 may output requirements based test cases 304 from a specification model 104 input, and may output augmented test cases 304 for model coverage from a design model 108 input. In one or more embodiments, the test objectives 310 may be attached as final states in the intermediate model 500. In one or more embodiments, a test objective 310 as a final state may be represented as a location (l) with no outgoing edge/arrow, as shown by $l_f$ in FIG. 5.

Figure 6A:
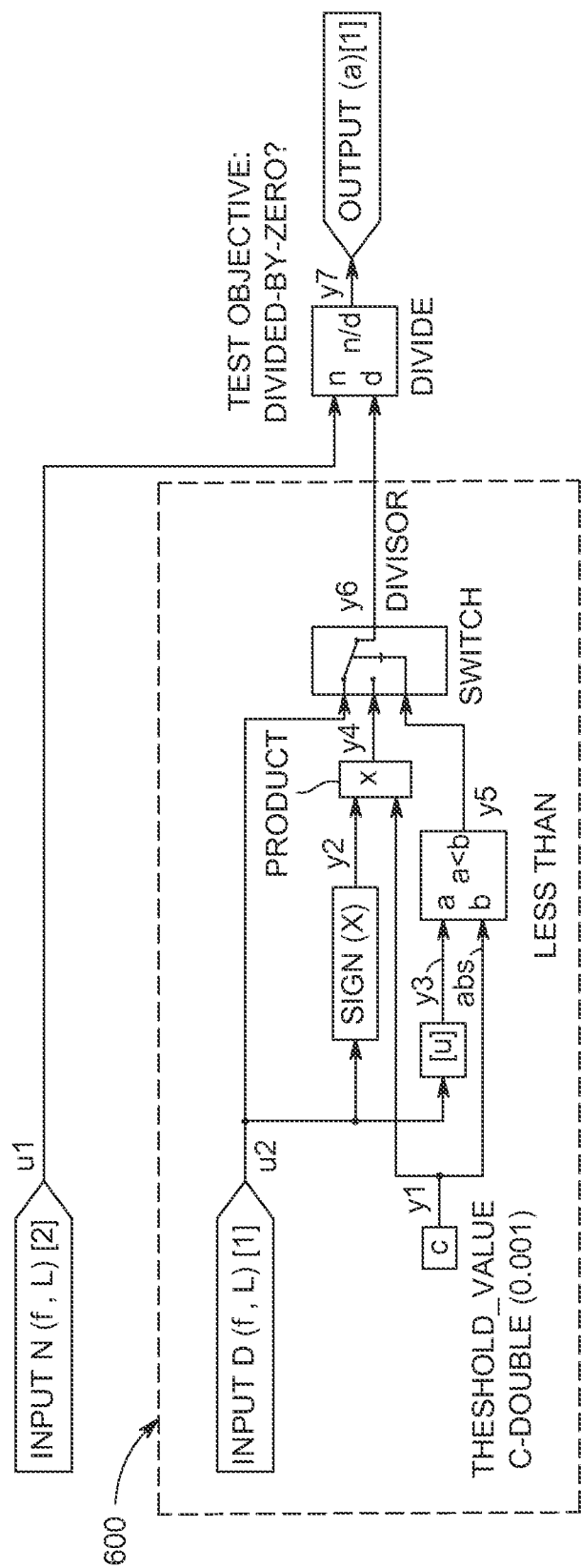
FIG. 6A illustrates a model according to some embodiments.

A sub-graph 600 (FIG. 6A) is determined in S216. In one or more embodiments, the sub-graph 600 may affect the objective. As shown in FIG. 6A, the sub-graph is indicated by the dotted rectangle. In one or more embodiments, the intermediate model 400 may include elements that may not affect the objective. For example, the intermediate model 400 may include elements that address several requirements, and the elements that may affect one requirement may not affect another requirement. The sub-graph 600 may isolate the relevant elements from the irrelevant elements, in one or more embodiments, to identify only elements affecting the test objective.

Figure 6B:
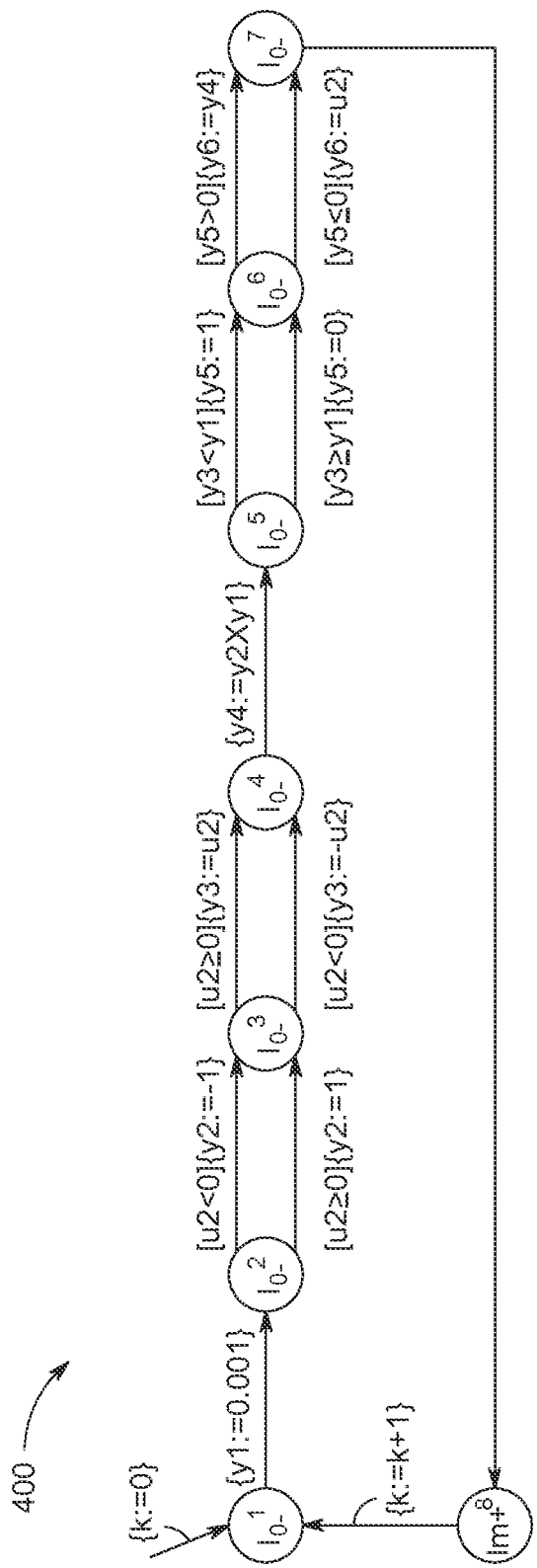
FIG. 6B illustrates a model according to some embodiments.

Then in S218, the intermediate model 400 is reduced (FIG. 6B). In some embodiments, the size of the intermediate model 400 may be reduced such that the reduced intermediate model (e.g., sub-model) only includes the portion of the intermediate model that is associated with the sub-graph 600. In one or more embodiments, reducing the size of the intermediate model may provide for a less complex sequence of computations to be performed by the generator computer module 314 to generate the test cases, thereby increasing efficiency. In one or more embodiments, the model is reduced automatically, and the reduced model may be mapped to the intermediate model 400.

A model type is identified in S220. In one or more embodiments, the generator computer module 314 receives the reduced intermediate model with test objectives 500, analyzes the reduced intermediate model, and based on the analysis of the reduced intermediate model identifies the model type, as will be further described below with respect to FIG. 7. In one or more embodiments, the identified model type may be based on the types of computations (e.g., mathematical properties) in the reduced intermediate model, for example, the model type may be one of a symbolic/boolean variable model type, a real number constraints model type, a non-linear arithmetic model type, and a dynamic or feedback loop model type. Other suitable model types may be used.

After the model type is identified, a test generation method is selected in S222, and a test case is automatically generated based on the identified model type via execution of the generator computer module 314 in S224. In one or more embodiments, the generator computer module 314 may analyze the identified model type and generate the test cases via application of one of a model-checking module 316, a constraining-solving module 318 or a reachability resolution module 320, for example, as selected by the generator computer module 314 based on the types of computations in the intermediate model per the identified model type. Test cases may be generated by the generator computer module 314 via execution of other suitable modules.

In one or more embodiments, the model-checking module 316 may be applied to reduced intermediate models identified as symbolic/boolean variable model types. The model-checking module 316 may map the reduced intermediate model (I/O-EFA) to a model-checker language (e.g., NuSMV). The model-checking module 316 may check the reachability of each requirement in the specification model 104, and generate test cases from the counter-examples in one or more embodiments.

In one or more embodiments, the constraint-solving module 318 may be applied to reduced intermediate models identified as real number constraint or non-linear arithmetic model types. The constraint-solving module 318 may gather the constraints of each requirement in the model (e.g., along the paths to each test objective) and apply mathematical optimization to obtain an input-output sequence satisfying the requirement (e.g., test objective) in some embodiments.

In one or more embodiments, the reachability resolution module 320 may be applied to reduced intermediate models identified as dynamic or feedback loop model types. The reachability resolution module 320 may use a compact model and analytically solve the dynamic equations to reduce the search space of test generation for models with dynamics. In one or more embodiments, each location of the compact model may be a computation path in the intermediate model. The reachability resolution module 320 may use the transition in the compact model to represent the mode switch of the model from one computation path to another computation path.

After the test case 304 is generated in S224, the test case 304 is displayed in S226. In one or more embodiments, the test case may be in an .sss file format. The test case may be in other suitable file formats. As described above, the test case 304 may be used to verify and validate the design model satisfies the software requirements or the implementation (e.g., source code/object code) is consistent with the design model.

Figure 7:
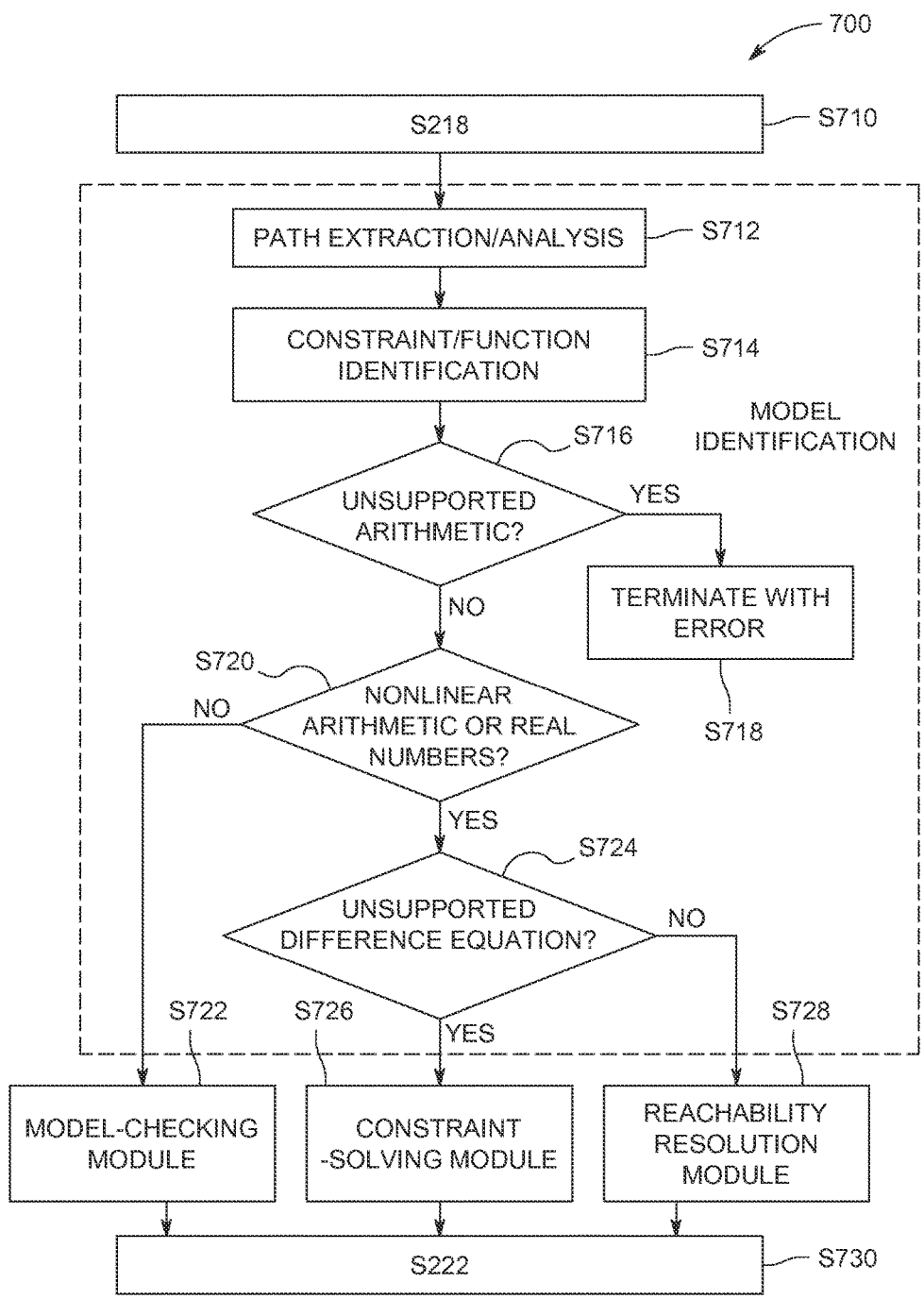
FIG. 7 illustrates a flow diagram according to some embodiments.

Turning to FIG. 7, one example operation according to some embodiments, FIG. 7 is a flow diagram of a process 700 for identifying a model type per S220 of process 200 shown in FIG. 2.

Figure 8:
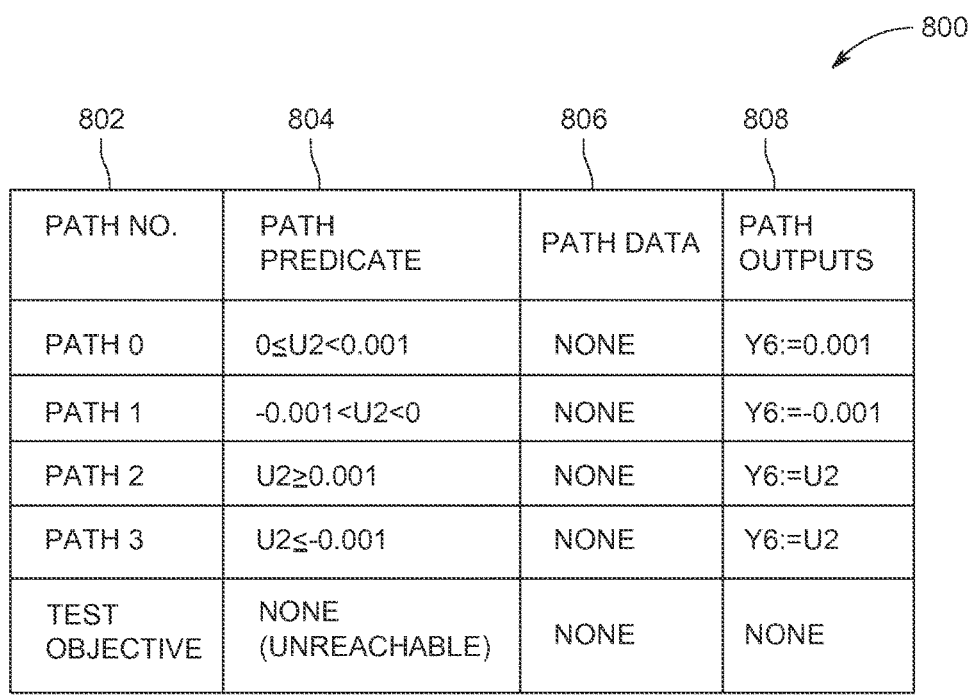
FIG. 8 is a path analysis result table according to some embodiments.

Initially, at S710, the intermediate model is reduced per S218. Then at S712, computation paths 402 and test objective paths are extracted from the reduced intermediate model and analyzed. In one or more embodiments, the analysis may determine whether the path is valid (e.g., represents a model behavior). In one or more embodiments, the valid computation paths may describe model behaviors and the test objective paths may describe test objectives. The extraction and analysis of the paths may provide a determination of the path constraints and data for each path. As used herein, path constraints may be entry conditions for the computation path; and path data may be data performed along the path after the path is entered. In one or more embodiments, the model type identification is based on the identification of the path constraints and data. The extracted constraints and data may be identified in S714. For example, FIG. 8 displays a table 800 generated by 106, showing the path extraction/analysis/identification for the intermediate model 400 shown in FIG. 4. In one or more embodiments, the table 800 may list, for each path 802, the path predicate (path entry condition) 804, the path data (path data update) 806, and the path outputs (expected output values) 808. In S716, it is determined whether there is unsupported arithmetic in the path constraints and data that none of the model-checking module 316, the constraint-solving module 318, or the reachability resolution module 320 can support. If there is unsupported arithmetic in S718, the process 700 proceeds to S718, and the process ends and an error message is generated. If there is no unsupported arithmetic in S716, the process 700 proceeds to S720, and a determination is made whether there is non-linear arithmetic or real numbers in the path constraints and data. If there is no non-linear arithmetic or real numbers in S720, the process 700 proceeds to S722, and the model-checking module 316 is applied to the reduced intermediate model. Then in S730, the test case 304 is generated, as described above with respect to S222. If there is non-linear arithmetic or real numbers in S720, the process 700 proceeds to S724, and a determination is made whether there are difference equations in the path data. If in S724 it is determined there are no difference equations or not all difference equations are supported in the path data, the process 700 proceeds to S726 and the constraint-solving module 318 is applied to the reduced intermediate model. Then in S730, the test case 304 is generated, as described above with respect to S222. If in S724 it is determined there are no unsupported difference equations in the path data, the process 700 proceeds to S728 and the reachability resolution module 320 is applied to the intermediate model. Then in S730, the test case 304 is generated, as described above with respect to S222. In one or more embodiments, some non-linear equations may not be supported depending on the capability of the optimization module (not shown) used in the constraint solving module 318. Models with these non-linear equations may lead to termination with error message S718.

Figure 9:
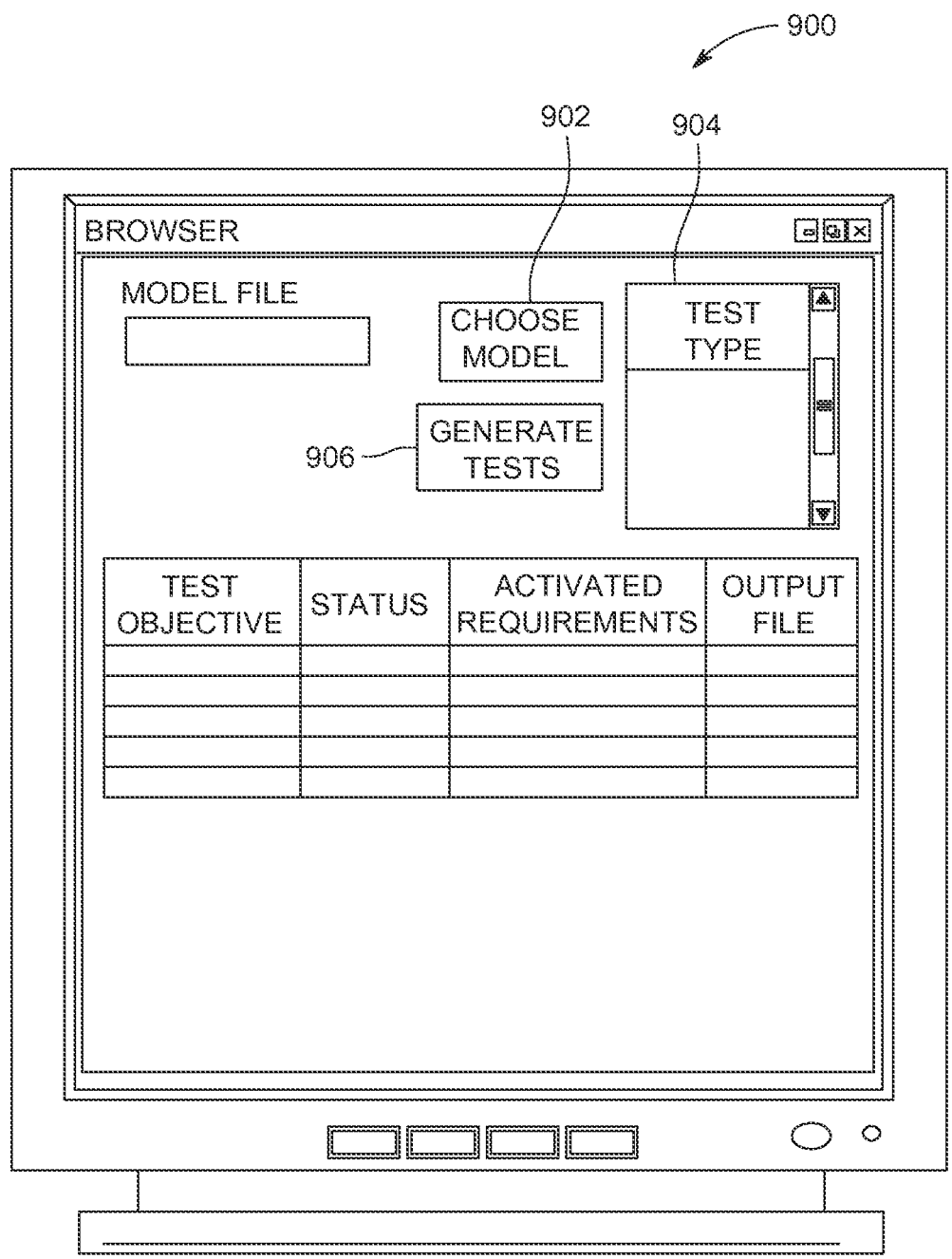
FIG. 9 illustrates a user interface according to some embodiments.
Figure 10:
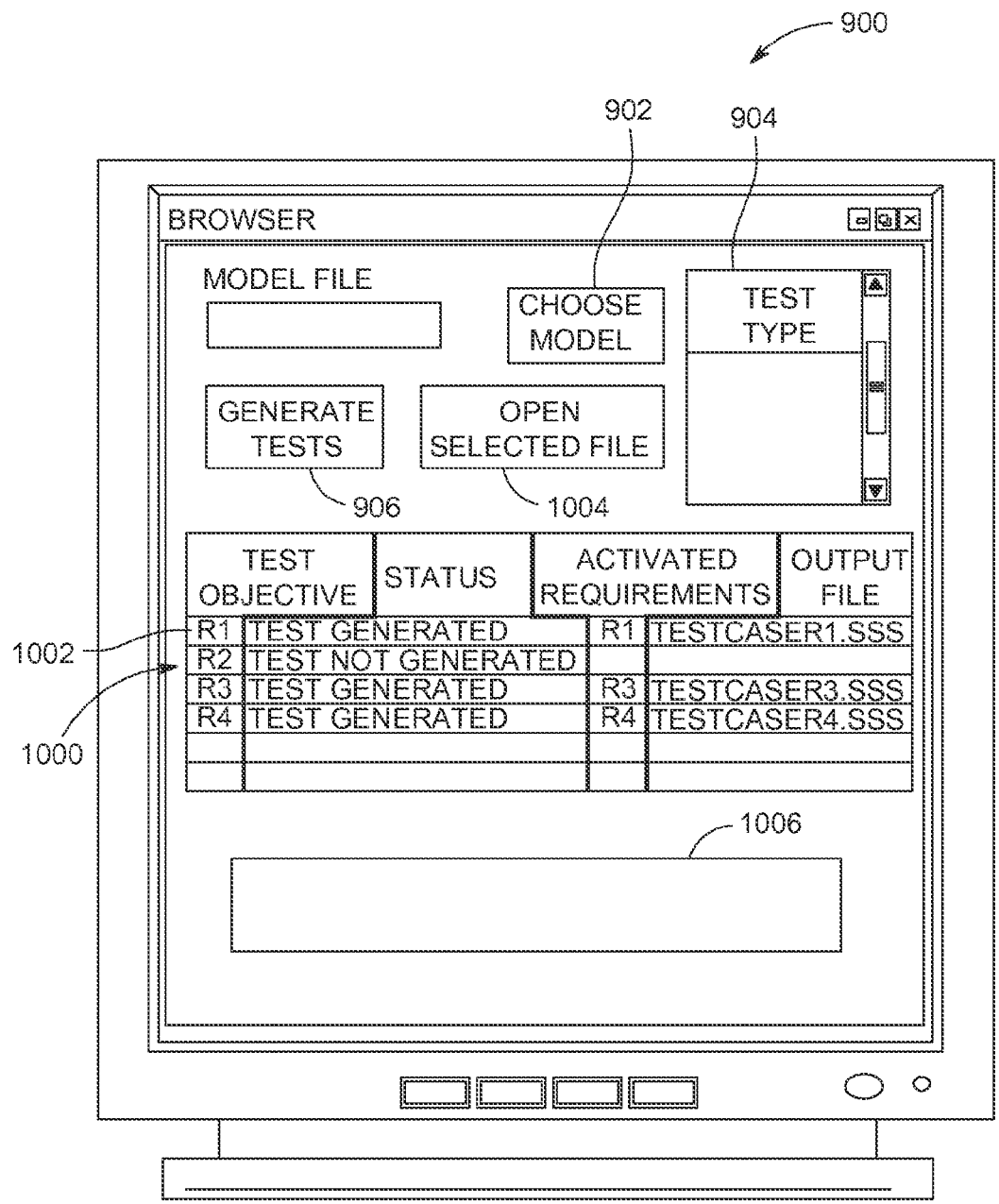
FIG. 10 illustrates a user interface according to some embodiments.
Figure 11:
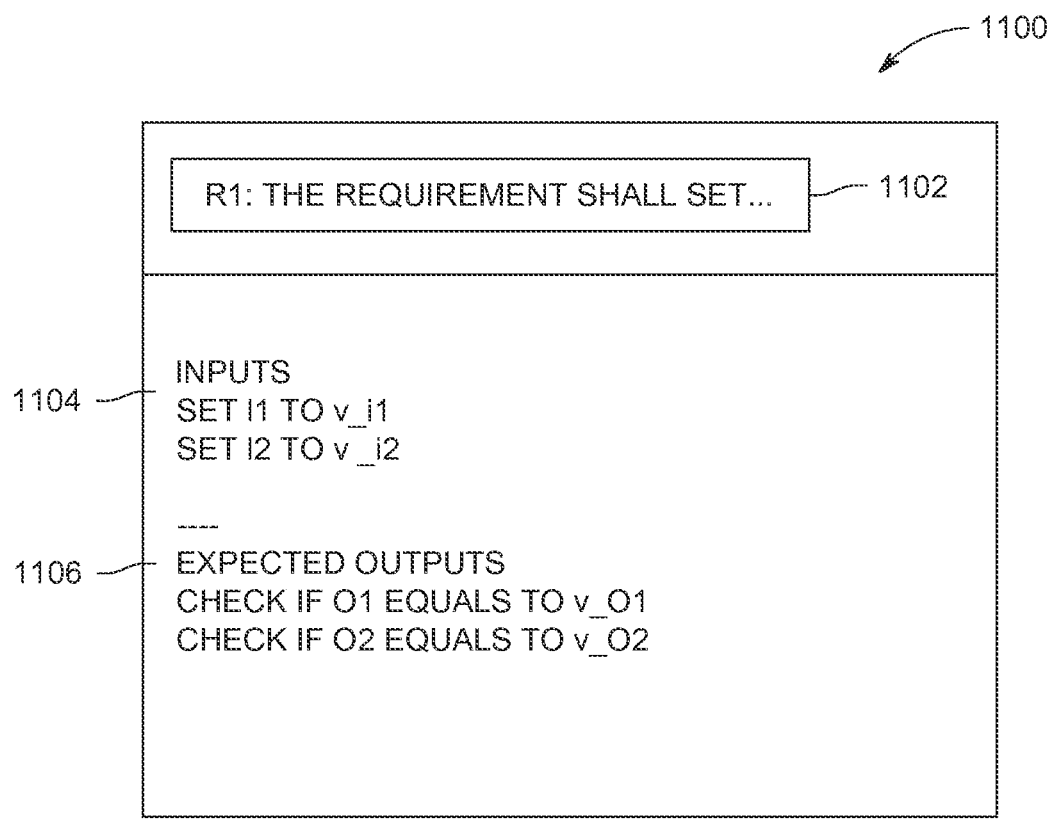
FIG. 11 illustrates a test case according to some embodiments.

Turning to FIGS. 9-11, an exemplary user interface 900 for generating test cases is provided. In one or more embodiments, for example, after a user selects a model for generating test cases (S210) via selection of the "choose model" button 902, and a variable map via application of a "choose variable map" button (not shown) for specification models, the user may select the type of test to generate. In one or more embodiments, a test type window 904 may be populated with tests suitable for the specification models being used. For example, for specification models, the tests may be requirement coverage tests, logic condition tests, or any other suitable tests; while for design models, tests may be MC/DC tests, decision coverage tests, or any other suitable tests. In one or more embodiments, a requirement coverage test may generate test cases to cover all requirements; while a logic condition test may generate test cases to cover all requirements and the logic conditions within each requirement. Then the user may select a "generate tests" button 906 to begin process 200 described above to generate requirements based test cases based on the selected test type. FIG. 10 shows that four tests have been generated in the Results window 1000. In particular, there are four requirements based test cases generated for the four requirements in the specification model. Each test case file 1002 may be opened for inspection by selecting the Requirement ID number and selecting the "open selected file" button 1004. In one or more embodiments, an execution status window 1006 provides the status of the requirements based automated test case generation module 106. For example, the execution status window 1006 may display a message indicating the tests are being generated at a particular location, and then that test generation is complete. FIG. 11 shows the test case 1100 generated for requirement R1. The generated test case 1100 may include, in one or more embodiments, the description of the related requirement 1102, a set of monitored (input) variables 1104 (which may include the names, values and data-types), and a set of expected output 1106 for the controlled (output) variable (which may include the names, values and data types). Once the requirements based test cases are generated, they can be tested on the design model. In one or more embodiments, the test cases and procedures consist of inputs and expected output values and may be executed against the design model 108 and Source Code/Executable Object Code to check their compliance with the specification model 104. In one or more embodiments, the test cases may be applied to the design model and the output generated from the application may be analyzed to determine correct functionality as well as structural coverage of the design model.

Figure 12:
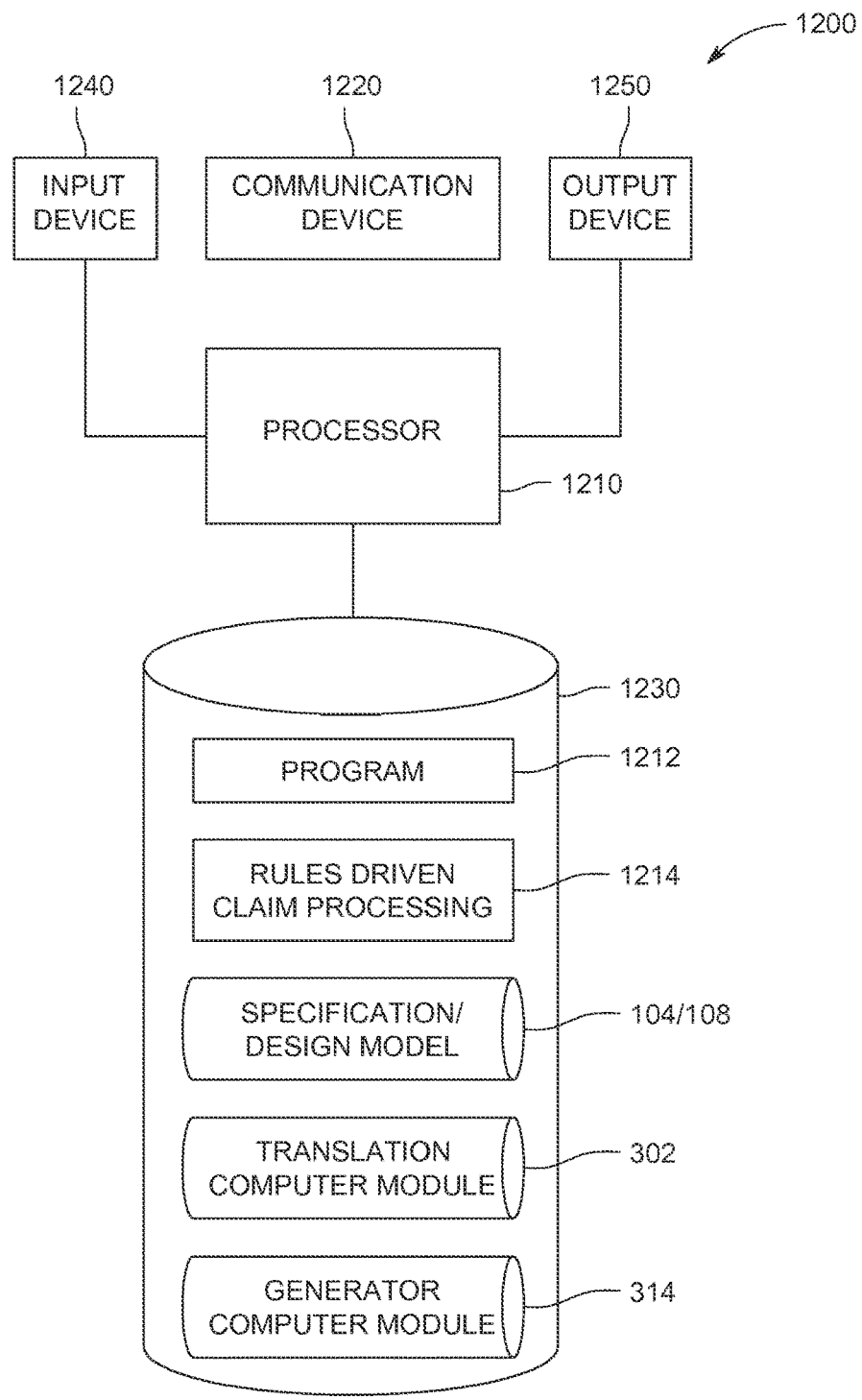
FIG. 12 is a block diagram of an automated test case generation processing tool or platform according to some embodiments.

Note the embodiments described herein may be implemented using any number of different hardware configurations. For example, FIG. 12 illustrates an automated test case generation processing platform 1200 that may be, for example, associated with the system 100 of FIG. 1. The automated test case processing platform 1200 comprises a test case generation platform processor 1210 ("processor"), such as one or more commercially available Central Processing Units (CPUs) in the form of one-chip microprocessors, coupled to a communication device 1220 configured to communicate via a communication network (not shown in FIG. 12). The communication device 1220 may be used to communicate, for example, with one or more users. The automated test case generation platform 1200 further includes an input device 1240 (e.g., a mouse and/or keyboard to enter information about variables, clustering and optimization) and an output device 1250 (e.g., to output and display the selected samples).

The processor 1210 also communicates with a memory/storage device 1230. The storage device 1230 may comprise any appropriate information storage device, including combinations of magnetic storage devices (e.g., a hard disk drive), optical storage devices, mobile telephones, and/or semiconductor memory devices. The storage device 1230 may store a program 1212 and/or automated test case generation processing logic 1214 for controlling the processor 1210. The processor 1210 performs instructions of the programs 1212, 1214, and thereby operates in accordance with any of the embodiments described herein. For example, the processor 1210 may receive specification and/or design models and then may apply the translation computer module 302 and then the generator computer module 314 via the instructions of the programs 1212, 1214 to generate a test case 304.

The programs 1212, 1214 may be stored in a compressed, uncompiled and/or encrypted format. The programs 1212, 1214 may furthermore include other program elements, such as an operating system, a database management system, and/or device drivers used by the processor 1210 to interface with peripheral devices.

As used herein, information may be "received" by or "transmitted" to, for example: (i) the platform 1200 from another device; or (ii) a software application or module within the platform 1200 from another software application, module, or any other source.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, a translation computer module and a generator computer module. The method steps can then be carried out using the distinct software modules and/or sub-modules of the system, as described above, executing on one or more hardware processors 1210 (FIG. 12). Further, a computer program product can include a computer-readable storage medium with code adapted to be implemented to carry out one or more method steps described herein, including the provision of the system with the distinct software modules.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

Those in the art will appreciate that various adaptations and modifications of the above-described embodiments can be configured without departing from the scope and spirit of the claims. Therefore, it is to be understood that the claims may be practiced other than as specifically described herein.

The invention claimed is:

1. A system comprising:
   a communication device operative to communicate with a user to obtain one or more requirements associated with a model for a test case generation module;
   a translation computer module to receive the model, store the model and generate an intermediate model;
   a generator computer module to receive the intermediate model, store the intermediate model, generate at least one test case;
   a memory for storing program instructions;
   at least one test case generation platform processor, coupled to the memory, and in communication with the translation computer module and the generator computer module, operative to execute program instructions to:
      transform the model into an intermediate model by executing the translation computer module;
      identify a model type associated with the intermediate model based on an analysis of a type of computation in a computation path extracted from the intermediate model by executing the generator computer module;
      select a test generation method based on analysis of the identified model type by executing the generator computer module;
      generate at least one test case for use in software validation and verification,
   wherein the intermediate model is reduced to include only a portion of the intermediate model associated with a sub-graph that identifies only elements affecting a test objective;
   wherein the intermediate model preserves one or more behaviors per an associated sampling time from the model;
   wherein the translation computer module maps one or more computation sequences of the at least one model to one or more computation paths in the intermediate model;
   wherein the system further comprises a converter module operative to convert one or more test criteria to one or more test objectives, wherein each test objective is associated with a test objective path;
   wherein the one or more test objectives are attached to the intermediate model; and
   wherein the computation paths describe model behaviors and the test objectives paths describe test objectives.

2. The system of claim 1 wherein the model is one of a specification model and a design model.

3. The system of claim 1 wherein each requirement includes one or more input variables and one or more output variables.

4. The system of claim 3 wherein the at least one generated test case includes a description of the requirement, a set of input variables, and a set of expected output, wherein the set of expected output is based on the one or more output variables.

5. The system of claim 1 wherein the model type is identified from a plurality of model types, wherein the plurality of model types includes a symbolic variable model type, a real number model type, a nonlinear arithmetic model type and a feedback loop model type.

6. The system of claim 1 wherein the generator computer module is operative to generate a table including one or more path constraints and one or more data based on the computation paths and the test objective paths.

7. The system of claim 1 wherein the generator computer module is operative to select one of a model-checking module, a constraint-solving module and a reachability resolution module to apply to the intermediate model to generate test cases based on the computation type.

8. The system of claim 1 wherein the sub-graph is a multiple entry sub-graph.

9. A method comprising:
   receiving one or more requirements associated with a model for test case generation;
   transforming the model into an intermediate model by execution of a translation computer module;
   identifying a model type associated with the intermediate model based on an analysis of a type of computation in a computation path extracted from the intermediate model by execution of a generator computer module;
   selecting a test generation method based on the identified model type by execution of the generator computer module;
   generating at least one test case for use in software validation and verification,
   wherein the intermediate model is reduced to include only a portion of the intermediate model associated with a sub-graph that identifies only elements affecting a test objective;
   wherein the intermediate model preserves one or more behaviors per an associated sampling time from the model;
   wherein the translation computer module maps one or more computation sequences of the at least one model to one or more computation paths in the intermediate model;
   wherein the method further comprising converting one or more test criteria to one or more test objectives, wherein each test objective is associated with a test objective path;
   wherein the one or more test objectives are attached to the intermediate model; and
   wherein the computation paths describe model behaviors and the test objectives paths describe test objectives.

10. The method of claim 9 wherein the model type is at least one of a symbolic variable model type, a real number model type, a nonlinear arithmetic model type and a feedback loop model type.

11. The method of claim 9 wherein the model is one of a specification model and a design model.

12. The method of claim 9 further comprising:
   selecting one of a model-checking module, a constraint-solving module and a reachability resolution module to apply to the intermediate model to generate test cases based on the computation type.

13. The system of claim 9 wherein selecting the test generation method comprises:
   determining whether there is an unsupported arithmetic in the computation path that none of a model-checking module, a constraint-solving module, or a reachability resolution module can support;
   if there is no unsupported arithmetic in the computation path then determining whether there is a non-linear arithmetic or real numbers in the computation path;
   selecting model-checking method for the test generation method if there is no non-linear arithmetic or real numbers in the computation path;

if there is non-linear arithmetic or real numbers in the computation path then determining whether there are unsupported difference equations in the computation path; and selecting constant-solving method for the test generation method if there are unsupported difference equations in the computation path else selecting reachability resolution method for the test generation method.

\* \* \* \* \*